United States Patent [19]

Jannson et al.

[11] Patent Number: 5,018,814
[45] Date of Patent: May 28, 1991

[54] BROADBAND SINGLE-MODE OPTICAL COUPLER

[75] Inventors: Tomasz P. Jannson; Joanna L. Jannson, both of Torrance, Calif.

[73] Assignee: Physical Optics Corporation, Torrance, Calif.

[21] Appl. No.: 479,451

[22] Filed: Feb. 13, 1990

[51] Int. Cl.$^5$ .............................................. G02B 6/26
[52] U.S. Cl. ........................ 350/96.15; 350/96.11; 350/96.12; 350/96.19
[58] Field of Search ............... 350/96.11, 96.12, 96.15, 350/96.16, 96.17, 96.19, 96.29, 96.30

[56] References Cited

U.S. PATENT DOCUMENTS

| 3,912,363 | 10/1975 | Hammer | 350/96.17 |
| 4,021,097 | 5/1977 | McMahon | 350/96.12 X |
| 4,630,885 | 12/1986 | Haavisto | 350/96.15 |
| 4,775,214 | 10/1988 | Johnson | 350/96.29 |
| 4,869,567 | 9/1989 | Millar et al. | 350/96.15 |
| 4,881,791 | 11/1989 | Mallinson et al. | 350/96.19 |
| 4,915,468 | 4/1990 | Kim et al. | 350/96.15 |

Primary Examiner—John D. Lee
Attorney, Agent, or Firm—Nilles & Nilles

[57] ABSTRACT

An apparatus for coupling light waves into a single-mode planar waveguide comprises a curved multi-mode waveguide. The multi-mode waveguide is thick so that its mode structure is practically continuous and its coupling wavelength selectivity is low. The curved multi-mode waveguide presents a variable single-mode coupling gap to the adjacent single-mode planar waveguide which achieves optimum balance between phase and amplitude conditions for coupling a broad range of wavelengths and tolerates varying wavelength light sources.

15 Claims, 7 Drawing Sheets

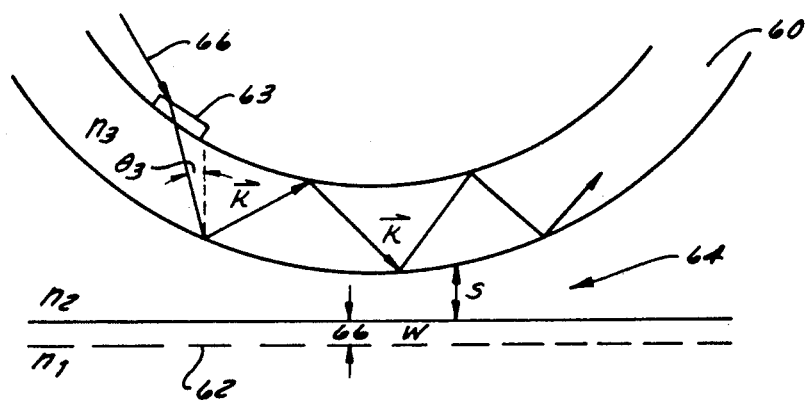
FIG. 7A
FIG. 7B
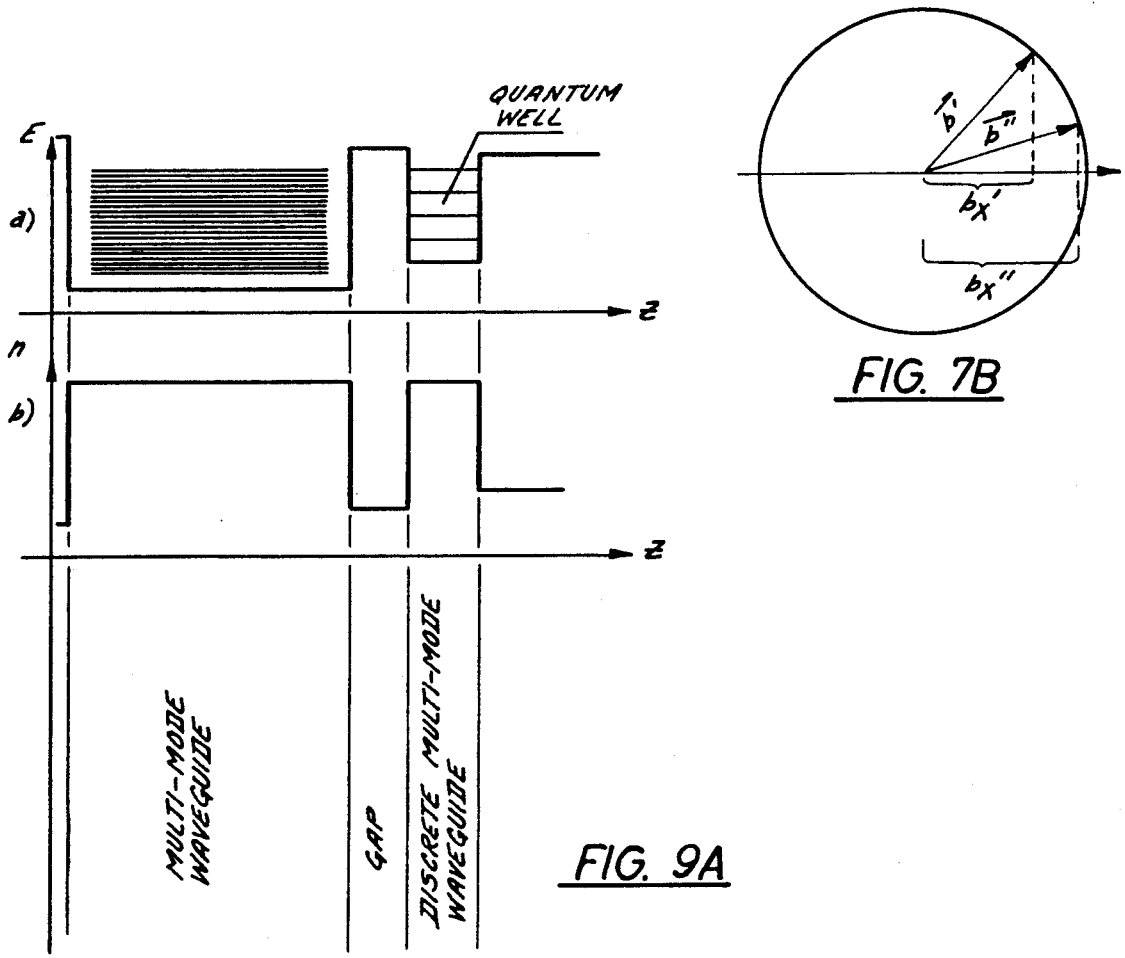
FIG. 9A

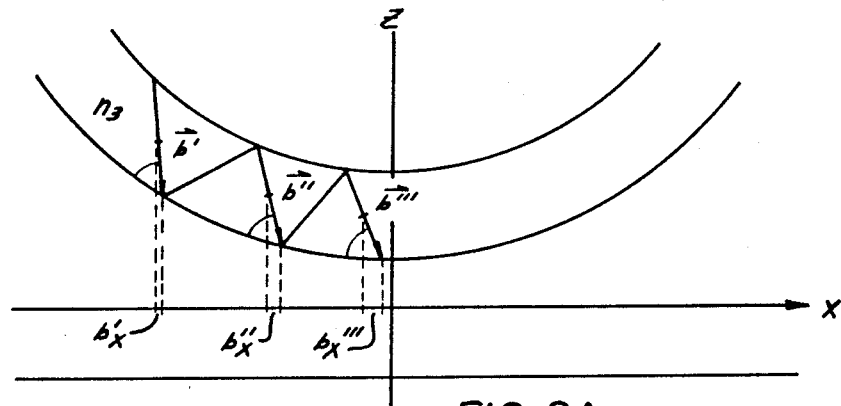
FIG. 8A
FIG. 8B
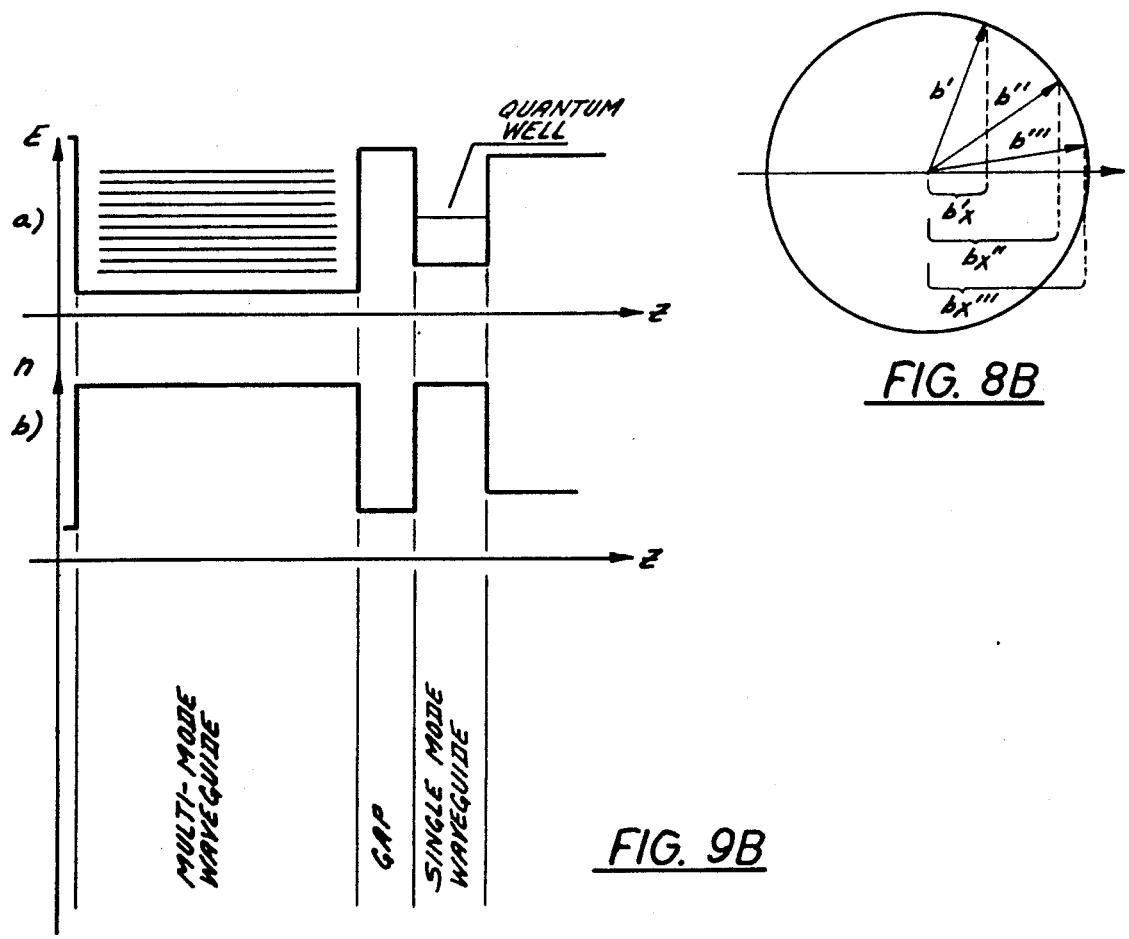
FIG. 9B

BROADBAND SINGLE-MODE OPTICAL COUPLER

BACKGROUND OF THE INVENTION

1. Field of Use

This invention relates generally to planar integrated optics. More specifically, this invention concerns devices which couple light waves into planar integrated optic circuits.

2. Description of the Prior Art

The recent high interest in single mode integrated optic circuits has been motivated by recent developments in integrated optic gyro programs, chip-to-chip and board-to-board VLSI interconnects, LAN/WAN communication, optical storage (disk) medias and other related technologies. Of particular current interest is the integrated optics imaging systems such as an integrated optical head for optical disk applications used in the well familiar compact disks (CD). Other important uses of the day include laser printing devices and medical devices, both of which have greatest utility when made compact in size. The planar topology of these devices is desirable and superior because it is close to PC board geometry. A third use of special interest is flat displays in compact electro-optic systems.

Planar integrated optics differs from predecessor freespace devices in that the light waves which propagate in these devices move in a planar light wave medium which is highly dispersive. The predecessor to planar integrated optics might be called bulk optics in which the system comprises a discrete light source, lens system and image plane, somewhat analogous to the source, lens, and image setup of a camera. The medium of propagation in the bulk optics type system is generally free space and therefore has little or no dispersion, i.e., the index of refraction n is approximately equal to the value 1 for all wavelengths ($\lambda$). As a consequence, bulk optics systems can uniformly operate in a multi-mode continuous status in which incident light is accepted by the system at all angles of incidence and thus contain an infinite number of modes or distinct light waves traveling in it.

In planar integrated optics, on the other hand, the index of refraction $n_e$ is strongly dependent on wavelength and, furthermore, depends on the mode of the light wave. Propagation of light waves in planar integrated optics systems therefore is usually, necessarily discrete mode. That is, only discrete sets of angles of incidence are accepted by the system and only discrete sets of modes are present in the system. This type of system is called multi-mode discrete and is characterized by a planar path having a thickness of approximately $10\lambda$. Discrete multi-mode systems typically suffer from problems such as intermode fluctuations, however, and thus single mode systems, where waveguide thickness is approximately equal to one wavelength, and continuous multi-mode systems, where waveguide thickness is much greater than one wavelength, are regularly used. Single-mode is usually better suited for planar applications than multi-mode.

Unlike bulk optics, planar integrated optics is thin. Cross-sectional sizes of waveguides involved are on the order of one wavelength. Therefore, contrary to the continuous-mode propagation structure of bulk optics, propagation in planar systems is discrete-mode.

Certain problems, however, remain in state-of-the-art planar integrated optics systems. Planar integrated optics generally require light sources having high wavelength tolerance specifications. Light waves emanating from light sources having low wavelength tolerance specifications are often not coupled into the system at all. LED light sources generally have line widths of fifty nanometers and significant variations in the position of the center wavelength. Laser diodes (LD), however, have far narrower line widths, on the order of 1Å, and have a temperature drift ratio of about 1Å per 1° C. Currently mass produced LD's for CD's where the center line width is about 780 nanometers are quite wavelength-variable. Variations of 10 to 20 nanometers in the position of the center wavelength among LD's is not uncommon. These variations in light sources are satisfactory for current CD technology and consequently there is little market demand for low cost LD's having controllable bandwidths such that wavelength shifts are less than 1 nm. These LD's are unsatisfactory, however, for more precise planar single-mode integrated optics use.

The reason that current LD's are unsatisfactory for single-mode planar integrated optics use is because such planar systems are highly dispersive. Dispersion causes the refractive index to change as a function of wavelength resulting in each wavelength light wave propagating through the waveguide in a different manner. For a general discussion of planar waveguide propagation see T. Jannson, Information Capacity of Bragg Holograms in Planar Optics, 71 J. Opt. Soc. of Am. (JOSA) 342, 346 (1981); T. Jannson & J. Sochacki, Primary Aberrations of Thin Planar Surface Lenses, 70 JOSA 1079, 1080 (1980) incorporated herein by reference.

State-of-the-art couplers do not deal well with such wavelength variation. Three basic types of couplers have been used in planar integrated optic systems to couple the free space propagating light wave into the planar waveguide. The three types of couplers that have been used are surface relief grating couplers, prism couplers, and direct coupling. Prism couplers are discussed in detail in R. Ulrich, Optimum Excitation of Optical Surface Waves, 61 JOSA 1467 (1971); R. Ulrich, Theory of the Prism-Film Coupler by Plane-wave Analysis, 60 JOSA 1337 (1970); and P. Tien and R. Ulrich, Theory of Prism-Film Couplers and Thin-Film Light Guides 60 JOSA 1325 (1970) incorporated by reference herein. All of these types of couplers are discussed generally in J. Jannson, Ph.D., Dissertation, The University of New Mexico, Albuquerque, New Mexico, May 1984, incorporated by reference herein. With respect to grating couplers in particular see R. Ulrich, Efficiency of Optical-Grating Couplers, 63 JOSA 1419 (1973) incorporated by reference herein. Direct coupling is satisfactory in most cases but not for use in integrated optical heads where the light source is located at the top of the plane of the recorded surface. The prism and grating couplers operate in the state-of-the-art by coupling the light wave through the prism or grating and directly into the single-mode wave guide. These types of couplers, although in widespread use, are of very narrow band, as described above, thus making them susceptible to and inefficient in the presence of light source wavelength shift.

One type of state of the art coupler that attempts to circumvent the narrow band problem mechanically varies the coupler structure in order to present a different angle of incidence for each wavelength. These types of couplers are highly impractical for planar integrated optics use. Their usefulness is, therefore, markedly reduced. Narrow band couplers comprising the state of the art have limited the large potential of planar integrated optics.

SUMMARY OF THE INVENTION

A broadband single-mode coupler for use with planar integrated optics is presented. Specifically, a broadband single-mode coupler comprising a multi-mode wave guide spaced apart from a single-mode wave guide is disclosed. The multi-mode waveguide of the present invention preferably is thick so that its mode structure is practically continuous (accepts virtually all modes) and its coupling wavelength selectivity poor (it accepts many wavelengths). The multi-mode wave guide is adiabatically curved, thus presenting a variable curvature single-mode coupling gap in relation to the adjacent single-mode planar integrated optics waveguide to an incident light beam. The curved, thick, multi-mode waveguide is spaced apart from the single-mode planar integrated optics waveguide such that a gap exists at all points between the two waveguides, and the gap thickness varies due to the relative curvature of the two waveguides. Relative curvature can also be achieved by etching the surfaces of the single-mode waveguide.

The coupling wavelength acceptance of the multi-mode waveguide is large because the multi-mode waveguide is relatively thick. The curvature of the multi-mode waveguide satisfies the conditions for optimum coupling of a light wave into the single mode waveguide. The multi-mode waveguide curvature achieves the optimum balance between phase and amplitude conditions for coupling a range of incident light wave wavelengths. Thus, the multi-mode/single-mode waveguide combination of the present invention satisfies the need for a planar integrated optics coupler that has the ability to accept and operate efficiently in the presence of a varying wavelength light source.

BRIEF DESCRIPTION OF THE DRAWINGS

FIGS. 7A and B are schematics of one embodiment of a broad-band single-mode coupler of the present invention and its unit vector b plot;

FIGS. 8A and B illustrate the variation in the parameter b existing in each infinitesimally small segment of a multi-mode waveguide of the present invention;

FIGS. 9A and B show, respectively, in schematic form the quantum mechanical analogies to a planar integrated optics coupling system for the discrete and single-mode case;

DESCRIPTION OF THE PREFERRED EMBODIMENTS

Referring to FIG. 1, a planar waveguide 12 containing elementary plane waves 14 constituting a single mode wave is depicted. The single mode wave 14 reflects off the upper and lower surfaces of the planar waveguide 12 as it propagates through the waveguide. A wave vector K' 16 represents the single mode wave after reflecting off the upper surface of the planar waveguide 12. Another wave vector K' 18 is also depicted and represents the single mode wave after reflecting off the lower surface of the planar waveguide 12. Planar waveguide 12 has index of refraction $n_1$. According to the Heisenberg uncertainty principle, the location of a photon in the elementary plane wave 14 cannot be defined. Rather, photons in the elementary plane wave are defined by the following equation:

$$p = (h/2\pi) \cdot k \qquad \text{(Eq. 1)}$$

where vector p determines the linear momentum of the photon, h is Planck's constant and k is the wave vector. The wave vector k is described by the following equation: $k = kn$, where k is the wave number which represents the length of the wave vector k and n is the unit direction of the wave vector which represents the direction of the wave vector k in the medium. The wave number k is represented by the following equation: $k = 2\pi/\lambda$ where $\lambda$ is the wavelength of the light wave in the medium. In a vacuum the wavelength of the light wave is $\lambda_0$ and in any medium the wavelength of the light wave in the medium is $\lambda_j = \lambda_0/n_j$ and $k_0 = 2\pi/\lambda_0$. Also shown in FIG. 1 is the angle $\theta$ which is the angle that the wave vector k makes with the axis perpendicular to the plane of the planar waveguide. For the particular medium shown in FIG. 1, $\theta = \theta' = \theta''$. The thickness of the planar waveguide 12 is W.

Figure 1A:
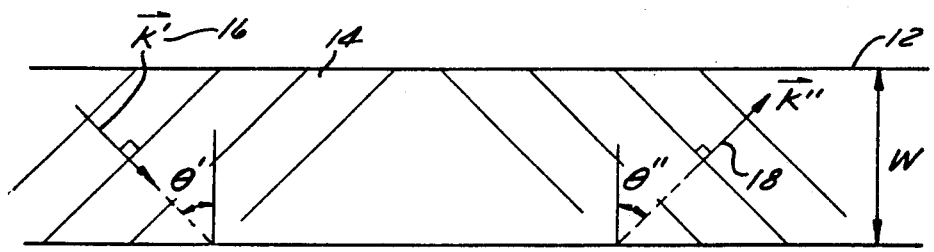
FIG. 1A is a schematic of an elementary plane wave in a single-mode waveguide and FIG. 1B is a schematic showing the direction of an elementary plane wave in a single-mode waveguide.
Figure 1B:
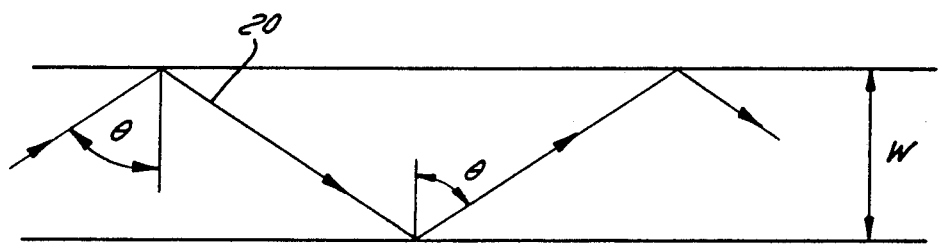

Referring now to FIG. 1B, a simplified version of FIG. 1A is shown. Here only the directional indicators 20 of the elementary plane wave 14 in FIG. 1A are depicted, and for simplicity the wave fronts of the elementary plane wave are not shown.

Figure 2:
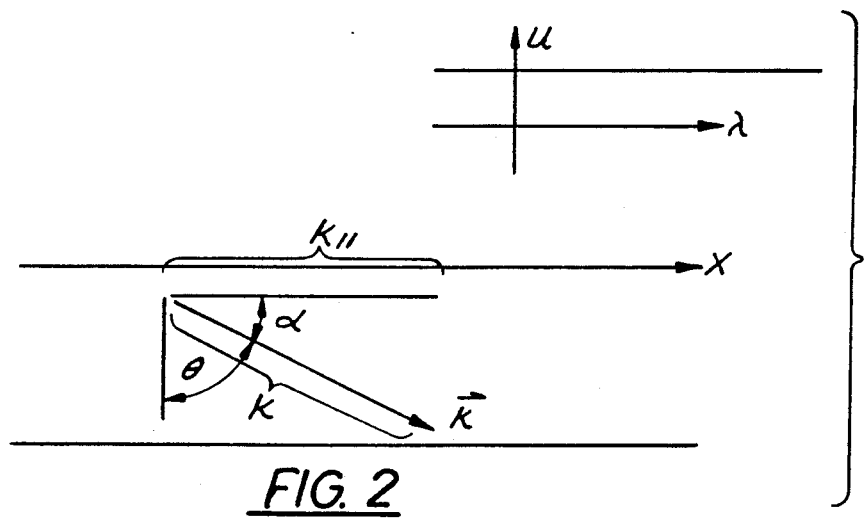
FIG. 2 is a schematic illustrating the k vectors of a plane wave propagating in a planar waveguide.

Referring now to FIG. 2, the wave vector k is further studied. The wave vector k can be broken down into its component in the x direction, $k_{//}$, which is represented by the following equation:

$$k_{//} = k \sin \theta \qquad (Eq. 2)$$

where $\theta$ is the angle between the axis perpendicular to the plane of the planar waveguide and the wave vector k. Alternatively, $k_{//}$ can be represented by the equation:

$$k_{//} = k \cos \alpha. \qquad (Eq. 3)$$

Recalling the previous equation $k = kn$, the following equation is derived:

$$k_{//} = k_0 n_1 \sin \theta \qquad (Eq. 4)$$

and in a particular medium with index of refraction $n_1$ and internal angle of reflection $\theta = \theta_1$ the equation becomes $$k_{//1} = k_{01} n \sin \theta_1 \qquad (Eq. 5)$$

A new quantity, $\beta$, is now introduced:

$$\beta = n_1 \sin \theta_1 \qquad (Eq. 6)$$

and thus the equation for $k_{//}$ becomes $$k_{//} = k_0 \beta \qquad (Eq. 7).$$

$\beta$ in the particular medium having index of refraction n can be defined as $$\beta_1 = k_{//1}/k_{01} = n_1 \sin \theta_1. \qquad (Eq. 8)$$

According to Snell's law, $\beta$ is the same for all media. $\beta$ is related then to the horizontal component (hereinafter that component along the x axis) of the wave vector k of the elementary wave constituting the single mode wave.

Figure 3:
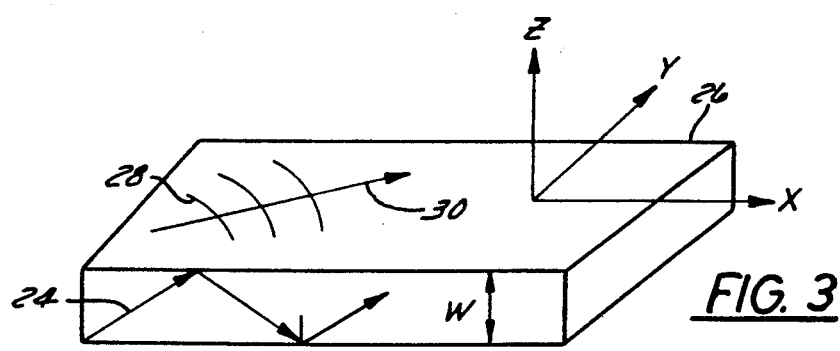
FIG. 3 shows a zigzag wave and its wave fronts propagating in a planar waveguide.

Referring now to FIG. 3, a schematic of a planar waveguide having a wave propagating therethrough is depicted. It can be seen from the top view (i.e., in the plane x-y) that the zigzag wave 24 propagating through the planar waveguide 26 can be viewed from the top and appears as a series of wave fronts 28 moving in the direction of the vector 30. The wave moving through the waveguide 26 is not to be confused with a surface wave moving only in the x-y plane. Rather, the wave fronts 28 move throughout the entire volume of planar waveguide 26.

Whether the planar waveguide 26, and planar waveguides in general, are single, multi, or continuous mode is determined by their thickness W. A single mode waveguide is one that only accepts light at one angle $\theta$ (for a given wavelength) and the thickness of a typical single mode waveguide is approximately 3 um. A multimode - discrete waveguide accepts a number of incident angles $\theta$ and is on the order of about 10 um in thickness. A multi-mode-continuous waveguide accepts virtually all angles $\theta$ (within some range) and is on the order of more than 100 $\mu$m in thickness. Optical imaging systems must use single-mode propagation because of the highly dispersive nature of waveguides, as compared to free space propagation. This is the fundamental problem of planar optics, and results in a different value of $\beta$ for each mode in any one waveguide.

Figure 4:
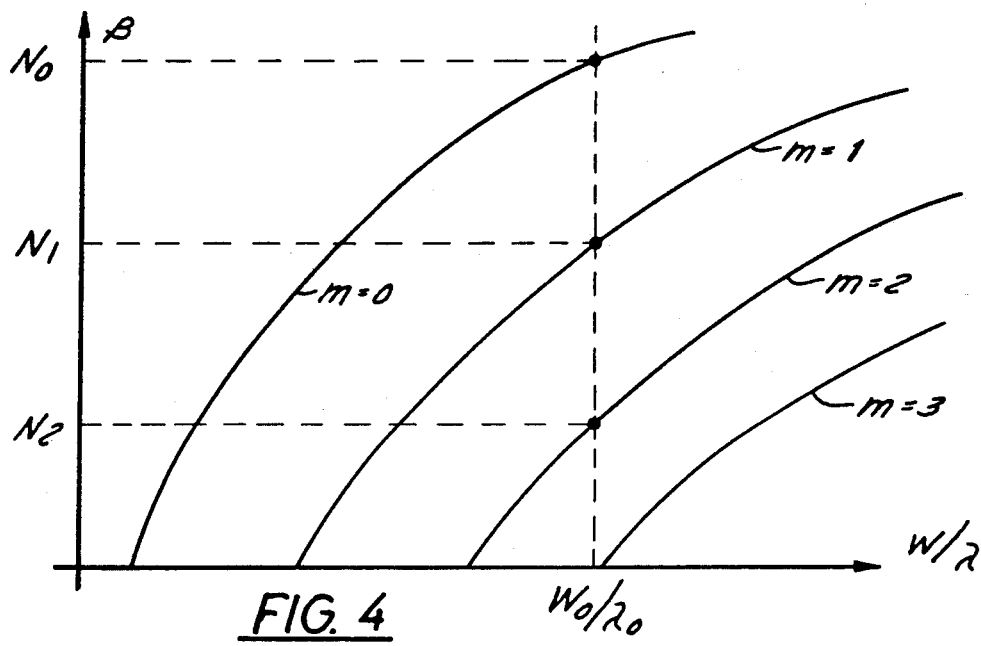
FIG. 4 is a schematic of the mode structure of a free waveguide.

Referring now to FIG. 4, 8 is plotted against the ratio of waveguide thickness to wavelength ($W/\lambda$). It is evident that that relationship is different for each mode in the waveguide, m = 0, 1, 2, 3 . . . . Taking the case of $W_0/\lambda_0$ plotted on the $W/\lambda$ axis, the corresponding values of $\beta$ for modes m = 0, m = 1, m = 2 are plotted. It is evident that for each of these modes $\beta$ is a discrete value: $N_0$, $N_1$, or $N_2$ for modes m = 0, m = 1, and m = 2. Thus, in any one planar waveguide, $\beta$, the component of the wave vector k along the x axis of the elementary plane wave, is different for each wave mode.

The need for single-mode waves in planar integrated imaging optics because the effective refractive index, $n_e$, (where $n_3 = \beta$) is different for each mode in the waveguide, is further highlighted if one plots $\beta$ versus W, the thickness of the waveguide. W varies in such devices as geodetic lenses in which n, the refractive index, is constant. Then, it can be seen that a separate and distinct curve is yielded for each mode m = 0, 1, 2, 3 . . . .

Referring again to FIG. 4, it can be seen that for each $\beta$ there is only one value of $\lambda$, and thus when shifts in the wavelength of the light source of the system occur, the normalized x component of the k vector, $\beta$, changes. Similarly, there is only one angle of acceptance, $\theta$, for each value of wavelength $\lambda$. If the incoming light wave is at an angle of incidence not roughly equal to $\theta$, the light wave will not be coupled into the waveguide.

Figure 5:
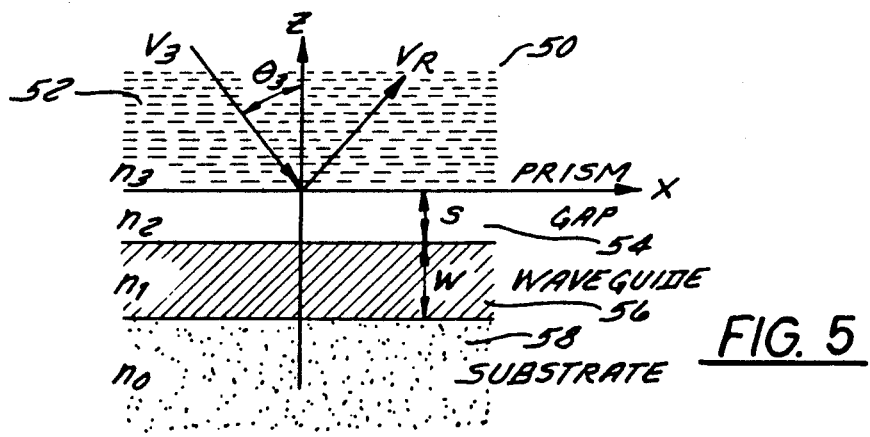
FIG. 5 is a schematic of the layered media forming a planar integrated optics coupler.

Referring to FIG. 5, a state-of-the-art prism-coupling system 50 is depicted having a prism 52, gap 54, film 56, and substrate 58 and angle of incidence of a light wave in the prism 52 of $\theta_3$. Substrate 58 has index of refraction $n_0$, film 56 has index of refraction $n_1$, gap 54 has index of refraction $n_2$, and prism 52 has index of refraction $n_3$. The following is the relationship between the various refractive indices of the various media depicted in FIG. 5:

$$n_2 \leq n_0 < n_1 \leq n_3 \qquad (Eq. 9)$$

Note that the gap has thickness S and the film has thickness W.

Figure 6:
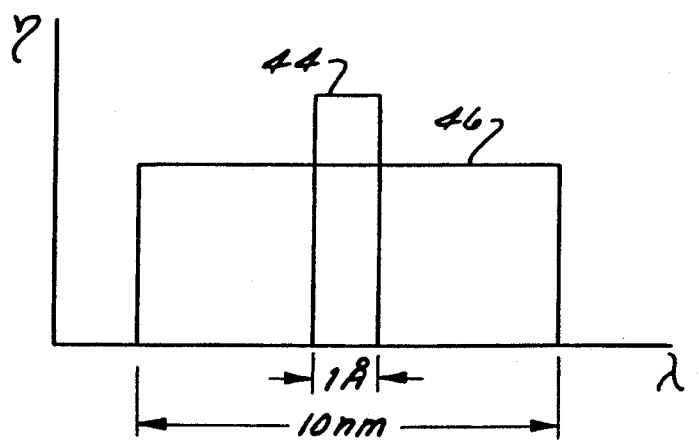
FIG. 6 is a graph illustrating wavelength acceptance range and coupling efficiency.

In typical single-mode waveguides, the permissible variation in $\lambda$ is about 1Å outside of which 0 coupling occurs and coupling efficiency, $\eta$ drops to 0. This is shown by curve 44 in FIG. 6. One way to increase waveguide tolerance to wavelengths of light requiring different angles of acceptance, i.e., wavelengths of light outside of the 1Å range, is to mechanically vary the waveguide and its coupling means (to match the angle of incidence to each wavelength). The broadband single-mode coupler of the present invention, however, can achieve a coupling efficiency versus wavelength of the magnitude depicted by curve 46 in FIG. 6 without such mechanical variation which would be difficult to implement.

Referring now to FIG. 7A, a broad-band single-mode coupler of the present invention is depicted wherein a continuous multi-mode waveguide 60 having a thickness greater than 100 um is separated from a single-mode waveguide 62 having thickness W by the gap space 64 of thickness S. The multi-mode waveguide has on its upper surface a grating TIR coupler 63 which couples an incident laser diode beam 66 having wavelength $\lambda$ into the multimode waveguide. Single-mode waveguide 62 may have a doped portion 66 of thickness W which contains the propagating light wave coupled from the multi-mode waveguide. Underneath the single-mode waveguide 62 is a substrate 68. Substrate 68 has an index of refraction $n_0$, the single-mode waveguide 62 has an index of refraction $n_1$, the gap 64 an index of refraction $n_2$, and the multi-mode waveguide 60 an index of refraction $n_3$. The more heavily doped region 66 of waveguide 62 having thickness W is approximately 3 um in thickness.

Wave vector k for the light wave propagating in multimode waveguide 60 is depicted. We now define the unit vector, b, by the following equation:

$$b = k/k \qquad \text{(Eq. 10)}$$

The b vector is different at each infinitesimally small segment of the multi-mode waveguide 60 due to the curvature of multi-mode waveguide 60. The change in the b vector can be seen in FIG. 7B wherein each of the radius vectors represents the b vector for each infinitesimally small segment of the multi-mode waveguide 60. Also shown in FIG. 7, is $b_x$, the normalized x-component of the b vector.

Referring now to FIGS. 8A and B, the unit vector b is illustrated in greater detail in the curved waveguide depicted therein as well as $b_x$ the horizontal component of the unit vector b. As will be shown below, the curved waveguide creates a continuous set of $b_x$ preferably so that one such vector exists along the curved waveguide for each incident wave having wavelength $\lambda$ to ensure that the phase condition is satisfied. It can also be seen that each such vector exists at a different point along the curved waveguide and that at each such point the distance between the curved waveguide and the optical path is preferably such that the amplitude condition at that point is satisfied as well.

Thus, the curvature of the multi-mode waveguide, and the variable gap S between the multi-mode waveguide 60 and the single-mode waveguide 62 can be made to optimize the trade-off between phase and amplitude conditions necessary for high coupling efficiency. The phase condition requires that for each wavelength incident upon the planar integrated optics a different effective refractive index be implicated according to the equation:

$$n_e = n_e(\lambda/W) \qquad \text{(Eq. 11)}$$

where $n_e$ is the effective (modal) refractive index, and W is the waveguide thickness. $n_e$ can also be presented in the form $$n_e = n \sin \theta \qquad \text{(Eq. 12)}$$

where n is the refractive index of the waveguide material and $\theta$ is the angle of the vector k with respect to the axis perpendicular to the plane of the waveguide. Thus, from Eq. 12 we see that in order to satisfy Eq. 11 in accordance with desired phase-matching conditions, there should be a different $\theta$ for each $\lambda$. The curvature of multi-mode waveguide 60 may be made in the preferred embodiment such that the phase-matching condition is satisfied at each infinitesimally small point along the curvature of the multi-mode waveguide. It can be seen that if the multi-mode waveguide 60 is severely curved, the phase condition will be satisfied for broad ranges of wavelengths. This is because the curvature would present a suitable angle of acceptance $\theta$, and thus a suitable vector $\beta$ for many different wavelengths according to the equation discussed supra, $\beta = n \sin \theta$, which was ultimately derived from the equation $k = kb$ by taking the x component of the vector k.

An extremely curved multi-mode waveguide, however, yields a large gap over most of the area between the multi-mode and single-mode waveguides which sacrifices the amplitude condition necessary for efficient coupling. If the curvature of the multi-mode waveguide 60 is shallow, however, the amplitude condition is satisfied well (the two waveguides would be in close proximity) but the phase condition is satisfied for only a narrow range of wavelengths.

The following analysis of the relationships between the characteristics of each of the media in a planar integrated optics coupler and the effect of those characteristics on coupling efficiency over a broad range of wavelengths is now studied. The following analysis is valid for the discrete multimode case and thus the formulas should have indices m denoting the mode of interest. Given that the overwhelming majority of practical cases are related to the single mode case, however, m is usually equal to zero.

As shown above, the effective planar (modal) refractive index can be written in the form:

$$\beta = n_3 \sin \theta_3 \qquad \text{(Eq. 13)}$$

where $n_3$ is the refractive index of the multi-mode waveguide, and $\theta_3$ the local incidence angle of the elementary plane wave in the multi-mode waveguide. $\beta$ is a dimensionless real quantity and is equal to the normalized x component of the vector k. Since any plane wave component varies in the z-direction (i.e., is a zigzag wave) according to the exponential equation $$\exp(\pm i\xi_j k z) \qquad \text{(Eq. 14)}$$

where k is the wave number, in the form: $k_0 = \omega/c$ and j designates the jth medium of the media shown in FIG. 5, we can introduce the quantity:

$$\xi_j(\beta) = (n_j^2 - \beta^2)^{\frac{1}{2}} = n_j \cos \theta_j \qquad \text{(Eq. 15)}$$

which is the variation in the z direction of the fields in the jth medium. Therefore, a monochromatic plane wave component in the y direction and varying in the z direction has the form:

$$\exp(i\beta x) \exp(\pm i\xi_j k z) \qquad \text{(Eq. 16)}$$

The Fresnel coefficients, for TE-polarization, can be rewritten in the form:

$$\tau_{jk} = \exp[-i2\phi_{jk}(\beta)] = \frac{(\xi_j - \xi_k)}{(\xi_j + \xi_k)} \; ; j,k = 0, 1, 2, 3, 4, \ldots \qquad \text{(Eq. 17)}$$

and the close-loop phase function, characterizing the change of phase during one loop waveguide propagation, has the form:

$$\Psi(\beta) = 2k\Psi_1(\beta)W - 2\phi_{10}(\beta) - 2\phi_{12}(\beta) \qquad \text{(Eq. 18)}$$

where $\phi_{jk}$ characterizes the phase change during interface reflection (see Eq. 17).

The free-waveguide mode solutions (i.e., the solutions for the case where the planar waveguide is not in close proximity to another waveguide into which light can leak (i.e., $S = \infty$)) are real, discrete, and satisfy the well-known equation:

$$\Psi(N_m) = 2m\pi; \; m = 0, 1, 2, 3, 4 \ldots \qquad \text{(Eq. 19)}$$

where integer m enumerates various waveguide modes.

According to Eq. 19, for the fixed waveguide thickness, W, and wavelength $\lambda$, there are only discrete solutions or poles, $N_m$, representing the modal refractive indices, as is illustrated in FIG. 4, and the modes are separated by $2\pi$ in phase. This follows the earlier discussion where it was shown that there is only one $\beta$ for each given $\lambda$ or W. The situation is analogous to that in quantum mechanics, where the energy levels of the hydrogen atom are always discrete.

Eqs. 18 and 19 are based on a step-function n-profile. In general, however, many types of n-profiles are described in the literature concerning state of the art integrated optics. For instance, the single-mode waveguide structure can be made distinct from its underlying substrate and n may have a step-function profile. In other cases where doping techniques are used, the single-mode structure is not distinct from the substrate and n may have a smooth profile. This distinction is important to system design because each type of n-profile has a different mode structure.

For simple interpretation, we can rewrite the continuity of $\beta$ in the form:

$$\beta = n_3 \sin \theta_3 = n_1 \sin \theta_1 \qquad \text{(Eq. 20)}$$

where the angles $\theta_1$ and $\theta_3$ represent the local incidence angles of the elementary plane waves in the $n_1$ and $n_3$ media (the single-and multi-mode waveguides). The superposition of these waves, for a planar (slab) waveguide, represents a mode solution. These principles are explored in M. Born, E. Wolf, *Principles of Optics*, Pergamon Press (1980); D. Marcuse, *Light Transmission Optics*, Section. 8.3 (1982) incorporated by reference herein. FIG. 5 illustrates these various media.

In order to deal with the multi-mode waveguide-single-mode waveguide coupling case (i.e., where $S < \infty$ and leakage into the waveguide adjacent the single-mode waveguide occurs), we need also to introduce the dimensionless coupling strength parameter, h, in the form:

$$h = \exp(ik_0 \xi_2 S); \text{ where } i = \sqrt{-1} \qquad \text{(Eq. 21)}$$

where S is the gap thickness and h is the attenuation of the amplitude of evanescent waves in the gap measured across its width S. This system behaves now as a 2D analog of two quantum wells, separated by the gap as shown in FIG. 9A which plots energy E versus distance in the z direction. It can be seen that the multi-mode waveguide has continuous energy levels and the discrete multi-mode waveguide discrete ones and are analogous to quantum wells separated by a high energy barrier. FIG. 9B shows the energy levels of a single mode waveguide in a plot of E versus z.

When the gap thickness becomes less than $\lambda$, the single-mode structure can leak to the multi-mode waveguide, and vice versa. This would be represented in the quantum mechanical analog by electrons tunneling from one well to the other as the barrier becomes sufficiently thin. The presence of the multimode waveguide causes a nonvanishing field to exist in the waveguide for all values of $\beta$. Therefore, the new mode structure which now has the form:

$$\gamma_m = N_m^{(p)} + iK_m \qquad \text{(Eq. 22)}$$

where $N_m^{(p)}$ and $K_m$ are real constants and, in the weak coupling approximation (h<1) can be described by the equations:

$$N_m^{(p)} = N_m - 2(h^2/X) \sin 2\phi_{12} \cos \phi_2 \qquad \text{(Eq. 23)}$$

and, $$K_m = 2(h^2/X) \sin^2\phi_{12} \sin 2\phi_{32} \qquad \text{(Eq. 24)}$$

which are the propagation constants of the mode m analogous to the mode m of a free waveguide (where $S = \infty$) where $$X(\beta) = -\partial\psi/\partial\beta \qquad \text{(Eq. 25)}$$

which is the negative derivative of $\Psi(\beta)$ (Eq. 18) and is a positive function of $\beta$.

The mode structure $N_m^{(p)}$ *is no longer discrete but continuous and the mode solutions are no longer real but complex. The propagating wave is therefore attenuated because it leaks out of the waveguide. The imaginary part represents the mode leakage, and the leakage length, $1_m$,* (the distance from the waveguide where the mode power declines to $(1/e)^2$ (by 86%)) is, $$1_m = (k_0 K_m)^{-1} \qquad \text{(Eq. 26)}$$

where $K_m$, defined above, is the attenuation constant. $1_m$ increases exponentially as the width S of the gap increases and is different for each mode m. Typically, for very small gap thicknesses, (e.g., S=0.05 um), the leakage length (for single mode) is $1_0 \approx 0.05$ mm (m=0) $1_0$ increases to about 1 mm, for S=0.1 um and practically increases to infinity, say, $1_0 > 1$ km, for S>0.5 um. Therefore, practical gaps are in the vicinity of the range of about S=0.1–0.2 um depending on mode structure. Because the necessary gap between the waveguide and the substrate is so small leakage is easily prevented.

Now that the above relationships and wave phenomena have been studied, the design of the broad-band single-mode coupler of the present invention can be optimized. The design is based on the fact that the phase condition ($\beta_I = N_m^{(p)}$) holds well for modal refractive indices close to the resonant value $N_m^{(p)}$, if, $$K|\beta_I - N_m^{(p)}|1_m < 1 \qquad \text{(Eq. 27)}$$

Using Eq. 26, Eq. 27 can be rewritten in the form:

$$|\beta_I - N_m^{(p)}| < K_m \qquad \text{(Eq. 28)}.$$

The auxiliary quantity, H, can be introduced in the form:

$$H(\theta_3, \lambda) = n_3 \sin \theta_3 - N_m^{(p)}(\lambda) \qquad \text{(Eq. 29)}$$

which, after differentiation, obtains:

$$dH = A_\theta d\theta_3 - A_\lambda d\lambda \qquad \text{(Eq. 30)}$$

where, $$A_\theta = n_3 \cos\theta_3, \; A_\lambda = \frac{\partial H}{\partial \lambda} \qquad \text{(Eq. 31)}$$

Assuming a single-mode case, Eq. (28) yields, $$\Delta H > K_o \qquad \text{(Eq. 32)}$$

Putting $\Delta H = 0$, the following equivalence between $\Delta\theta_3$, and $\Delta\lambda$ is obtained:

$$\Delta\theta_3 = \frac{A_\lambda \Delta\lambda}{n_3 \cos\theta_3} \qquad \text{(Eq. 33)}$$

This fundamental relationship allows an evaluation of the necessary angular change, $\Delta\theta_3$, necessary to compensate for changes in the wavelength $\lambda$.

In state of the art couplers, in order to satisfy the phase condition it is necessary to employ one particular incident angle $\theta$ for a given wavelength. In other words, if the phase condition is satisfied in the form $\beta = N_m{}^{(p)}(\lambda)$ for one particular $\lambda$, the phase condition will not be satisfied for other $\lambda$. The present invention, to the contrary, presents a continuous set of $\beta$ (the horizontal component of the normalized k vector) for each particular direction and wavelength of the incident wave. Therefore, as shown below, there will exist the one particular $\beta$ that will satisfy the phase and amplitude conditions for a particular incident light wave for all points between the two extremal $\beta$ which satisfy the phase condition.

Figure 10:
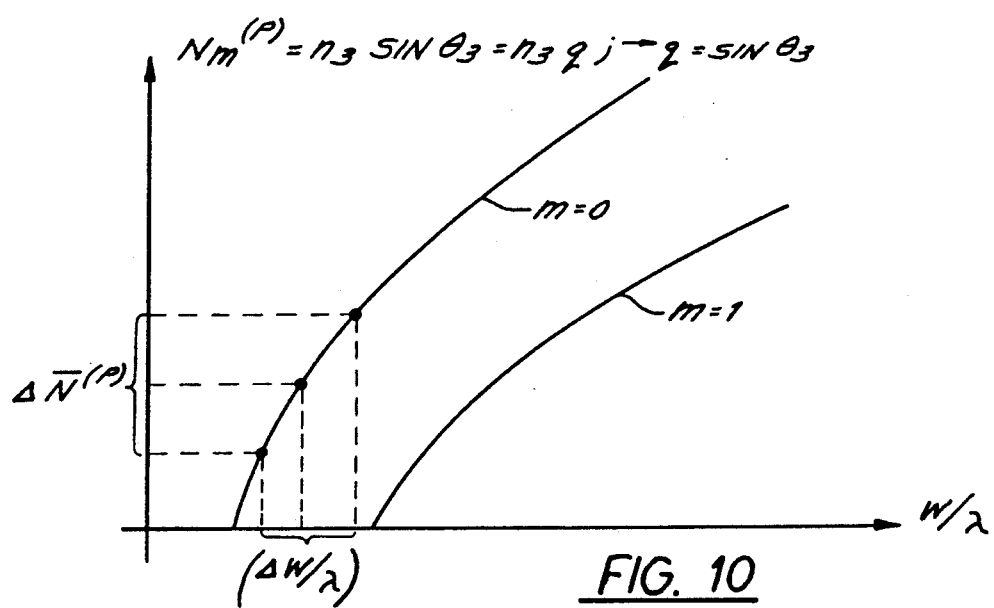
FIG. 10 is a graph showing the relationship between waveguide thickness W to wavelength $\lambda$ and the mode structure $N_m^{(p)}$ for a particular waveguide bounded by another medium (nonfree)
Figure 11:
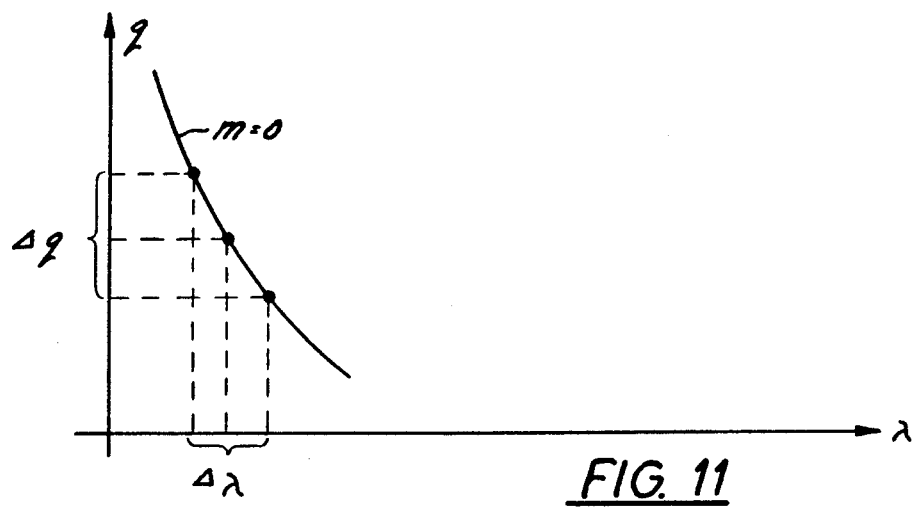
FIG. 11 is a graph showing the relationship between q and $\lambda$, where $q = \sin \theta_3$ (where $\theta_3$ is the angle of incidence of the light wave on the multi-mode waveguide)

Referring now to FIGS. 10 and 11, FIG. 10 is analogous to FIG. 4 but refers to the angle of incidence $\theta_3$ by the relation: $q = \sin\theta_3$. Therefore, in this figure, the relation $N_m{}^{(p)} = n_3\sin\theta_3 = n_3q$ (where $q = \sin\theta_3$) versus $W/\lambda$ is illustrated. FIG. 10 illustrates the mode relationship of Eq. 19 using the relationship of Eq. 20. Due to the fact that instead of a single angle of incidence, $\theta_3$, we have a continuum of these angles, we have also a continuum of values ($\lambda$) to be accepted $$\Delta\theta_3 \to \Delta\lambda \qquad \text{(Eq. 34)}$$

Using Eq. 20 we can modify a single-mode curve ($m=0$) having curvature q to the form illustrated in FIG. 11. The relationship between $\Delta q$ and $\Delta\lambda$ is, in fact, described by Eq. 33.

A basic trade-off exists between the phase condition:

$$n_3 \sin \lambda_3 = N_p{}^{(m)} \qquad \text{(Eq. 35)}$$

and the amplitude condition, in maximizing the coupling efficiency. In J. Jannson, Prism Coupling Selectivity in Anisotropic Uniaxial Waveguides, 20 Appl. Opt. 374 (1981), for example, it was shown that, in the case of a Gaussian beam with waist, w, (the width of the beam at its source point), the maximum coupling efficiency exists for a leakage length, $l_m$, of the order of the beam waist. Since typical beam waists are about 1 mm wide, the leakage length should also be of the same order according to the equation $$w \approx l_m \qquad \text{(Eq. 36)}.$$

This condition determines the optimum range of the gap thickness, S, to be in the range 0.1–0.2 um. The coupling efficiency may be unacceptably low if S is substantially outside this range.

Figure 12:
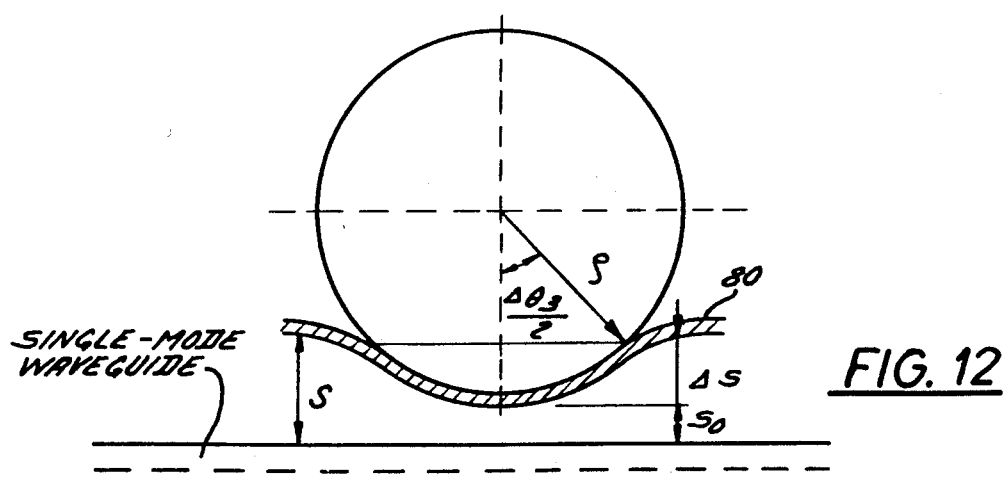
FIG. 12 is a schematic of the required curvature of the multi-mode waveguide of the present invention.

Therefore, the angles of incidence, $\theta_3$, have to be sufficiently changed over that portion of the multi-mode waveguide where the gap thickness between the multi-mode and single-mode waveguides is 0.1–0.2 um. This condition determines the necessary curvature of the multi-mode waveguide, as shown in FIG. 12 showing a multi-mode waveguide 80 having curvature $\rho$ at angle $\Delta\theta_3/2$ Using this figure, we obtain, $$\rho - \Delta S = \rho \cos(\Delta\theta_3/2) \qquad \text{(Eq. 37)}$$

where $\rho$ is the multi-mode waveguide curvature. Assuming the incident angle range is rather small ($\Delta\theta_3 \ll 1$), Eq. 37 can be rewritten in the form:

$$\rho\left(1 - \frac{(\Delta\theta_3)^2}{8}\right) = \rho - \Delta S \qquad \text{(Eq. 38)}$$

and, finally, $$\rho = \frac{8\,\Delta S}{(\Delta\theta_3)^2} \qquad \text{(Eq. 39)}$$

Of course, total distance between the multi-mode and single-mode waveguides is calculated from the equation $S = S_0 + \Delta S$, where $S_0$ is the constant bias distance illustrated in FIG. 12. Thus, in order to find the necessary angular range, $\Delta\theta_3$, from Eq. 33, the following procedure may preferably be followed:

(1) solve, numerically, mode Eq. 19 for a particular free ($S = \infty$) waveguide structure (with given refractive index profile and waveguide thickness W) in order to determine the mode dispersion curves as shown in FIGS. 4, 10, and 11;
(2) calculate new corrected mode solutions as in Eqs. 22, 23, and 24 for a non-free ($S < \infty$) waveguide;
(3) calculate the average $A_\lambda$ coefficient from Eq. 31,
(4) calculate angular tolerance $\Delta\Theta_3$ from Eq. 33,
(5) calculate the required multi-mode waveguide curvature, $\rho$, from Eq. 39.

EXAMPLE I

Assume that the required wavelength acceptance is 10 nm, in the vicinity of 800 nm-wavelength. This means that all laser diode (LD) wavelengths within 800 nm $\pm$ 5 nm will be accepted. Assume that after following steps 1–5 above, the following obtains:

$$\Delta\Theta_3 \sim 0.01 \text{ rad} \qquad \text{(Eq. 40)}$$

Putting this result, as well as $\Delta S = 0.2$ um, into Eq. 39, we obtain $\rho = 1.6$ cm. This is the required curvature of the multimode waveguide.

EXAMPLE II

Figure 13A:
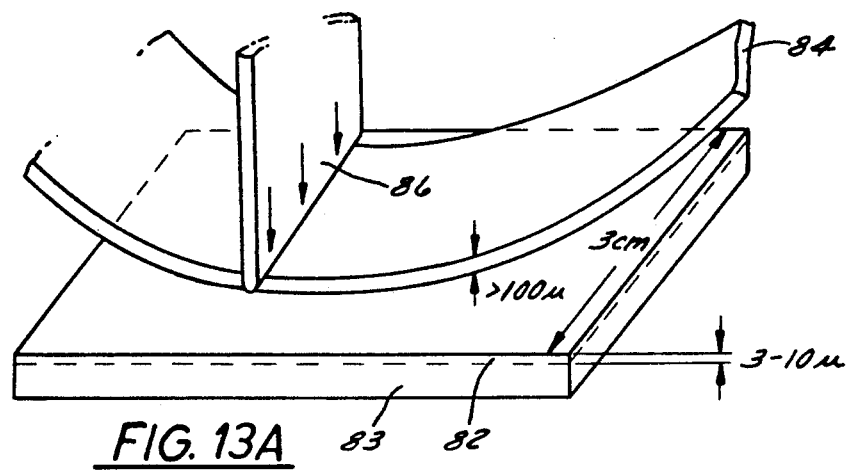
FIGS. 13A and B are schematics, respectively, of the top and side views of a razor-type apparatus for obtaining the required curvature of the multi-mode waveguide portion of the present invention.
Figure 13B:
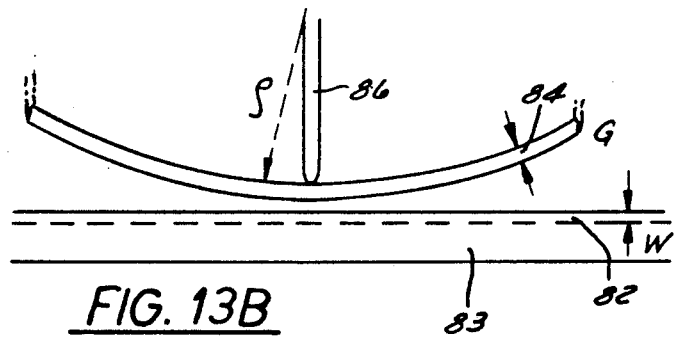

Assume $\Delta\lambda = 100$ nm. Now $\Delta\theta_3 = 0.1$, and, according to Eq. 38, we obtain very low radius of curvature, namely 0.1 mm (or 100 um). Such a high curvature can be obtained by special razor-type techniques, as those illustrated in FIGS. 13A and B showing a single-mode waveguide 82, substrate 83, multi-mode waveguide 84, and razor curving device 86 in plan view 13A and side view 13B. Multi-mode waveguide 84 has thickness G, and single-mode waveguide 82 has thickness W. By placing adjusted downward pressure on razor 86, we can approximately obtain the required curvature $\rho$. In general, by using the waveguide strips with razor-type pressure, we obtain a high degree of freedom in gap shape adjustment as well as the waveguide curvature adjustment. However, the optimum curvature can be obtained only by precise design and shaping of the multi-mode waveguide and its distance from the single mode waveguide according to steps 1–5 above. Strictly speaking the profile S (see FIG. 12) can be written in the form $$S = S(x) \qquad \text{(Eq. 41)}$$

Figure 14:
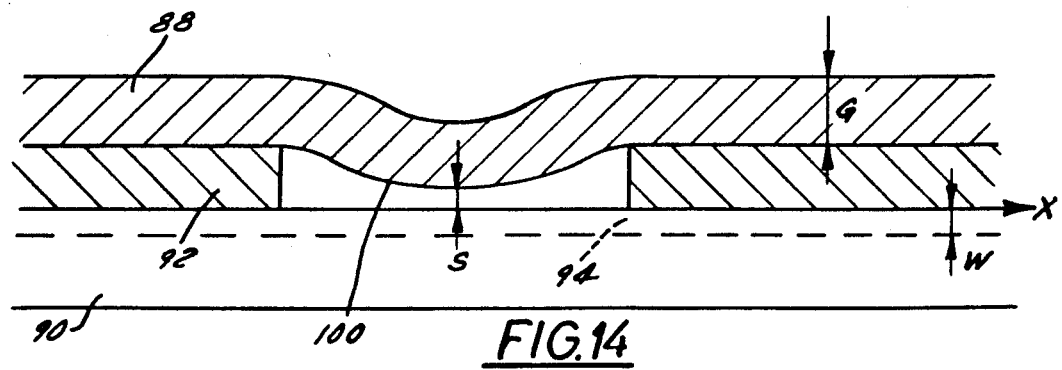
FIG. 14 is a schematic of another embodiment of the present invention which achieves the required curvature of the multi-mode waveguide.

FIG. 14 shows a modified construction utilizing distance plates where the multi-mode waveguide is designated 88, the single-mode waveguide is designated 90, the distance plates are designated 92 and 94, and the required curvature S(x) is designated 100. The required curvature is present between distance plates 92 and 94. It is also to be noted that there may preferably be a gap (not shown) between the distance plates 92 and 94 and the multi-mode waveguide 88 sufficient to prevent leakage into the distance plates. In the alternative, the distance plates can be made of material having a lower index of refraction n than that of the multi-mode waveguide to prevent leakage.

Figure 15A:
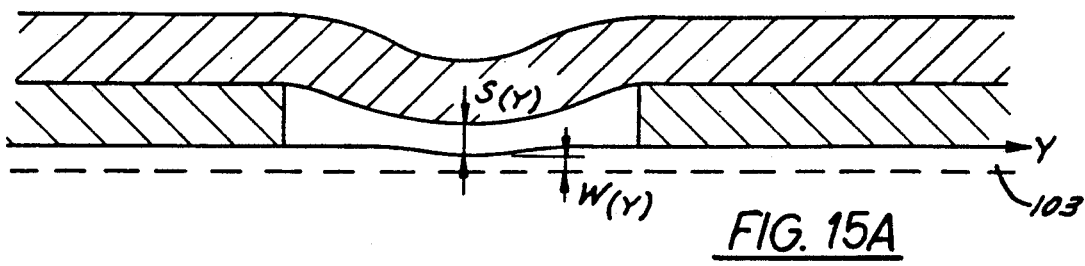
FIGS. 15A and B show, respectively, additional degrees of freedom in a planar integrated optics device of the present invention achieved by varying the thickness of the single-mode waveguide and by varying the doping diffusion length of the single-mode waveguide.
Figure 15B:
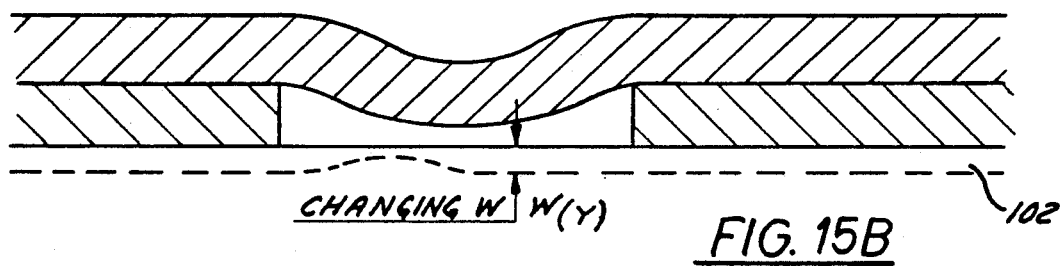

In FIGS. 15A and B, an additional degree of freedom is added by varying the single-mode waveguide 102 thickness. This permits more exact coupling efficiency adjustment. In FIG. 15A, the waveguide is etched from the top, and in FIG. 15B, the doping diffusion length is varied each in accordance with state-of-the-art techniques. There are many other mechanical variations that can be employed to obtain the required curvature profile S(x).

Figure 16A:
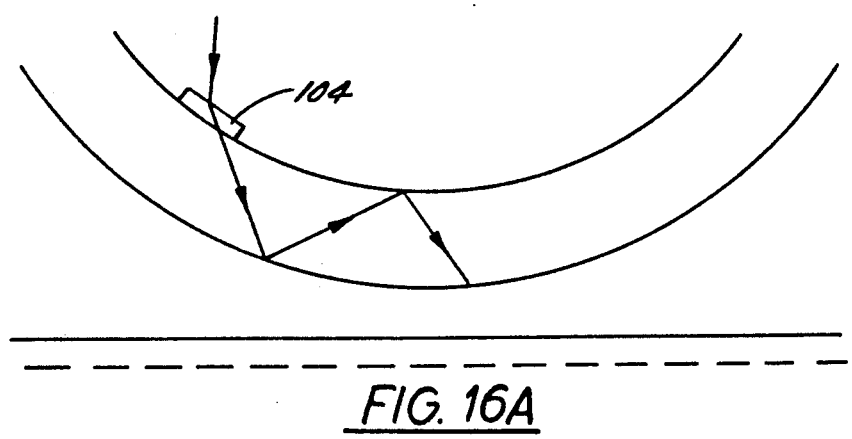
FIGS. 16A and B show, respectively, reflection and transmission holographic coupling gratings attached to the multimode waveguide.
Figure 16B:
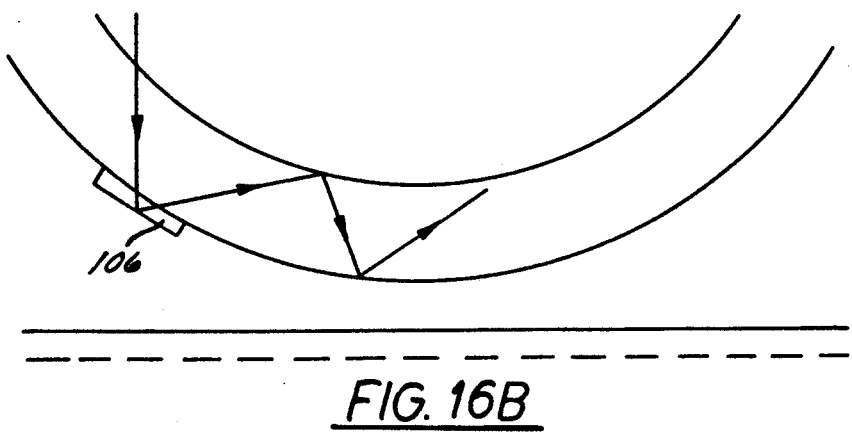

As shown in FIGS. 16A and B, the holographic grating TIR (total internal reflection) coupler can be either transmission 104 as in FIG. 16, or reflection 106 as in FIG. 16B. It can be made of photoresist, DCG (dichromated gelatin), polymer, or any other suitable holographic material. But any reflection grating coupler must necessarily be of the volume type and preferably rather broad band as those used for wavelength division multiplexers. See Moslehi et al., Fiber Optic Wavelength Division Multiplexing and Demultiplexing Using Volume Holographic Gratings, 14 Optics Letters 1088 (1989) incorporated by reference herein. In the case of DCG/polymer grafts and composites, the Bragg wavelength, Bragg bandwidth, and wavelength dispersion can be varied as needed.

It is to be understood that embodiments of the present invention not disclosed herein are fully intended to be within the scope of the claims.

We claim:

1. An apparatus for coupling light waves into a single-mode planar optical path comprising a curved multi-mode waveguide spaced apart from the planar optical path.

2. The invention as defined in claim 1, wherein the phase-matching condition of the apparatus is satisfied for a 1-100 nm range of wavelengths.

3. The invention as defined in claim 1, wherein the multi-mode waveguide is spaced apart from the planar optical path so that the leakage length is about equal to the waist of the light wave source.

4. The invention as defined in claim 1, wherein the distance between the multi-mode waveguide and the planar optical path is in the range 0.1-0.2 um.

5. The invention as defined in claim 1, wherein the multi-mode waveguide has continuous mode structure.

6. The invention as defined in claim 1 wherein the planar optical path is 1-10 $\mu$ thick.

7. An apparatus for coupling light waves into a single-mode planar optical path comprising a multi-mode waveguide separated from the planar optical path except at one location by distance plates, the multi-mode waveguide at said location being curved toward the planar optical path and separated from the planar optical path by a gap, the distance across the gap varying from point to point across said location.

8. The invention as defined in claim 7 wherein the gap is further defined by etching the planar optical path across said location.

9. A coupler for coupling light waves into a planar integrated optic circuit comprising:
   a multi-mode waveguide;
   a total internal reflection grating which couples light waves into the multi-mode waveguide;
   the multi-mode waveguide being spaced apart from the planar integrated optic circuit by a gap, the distance across the gap varying from point to point between the multi-mode waveguide and the planar integrated optic circuit.

10. The invention as defined in claim 9 wherein the grating comprises a volume hologram made of photoresist, dichromated gelatin, or DCG/polymer graft or composite.

11. The invention as defined in claim 9 wherein the grating is a holographic transmission grating.

12. The invention as defined in claim 9 wherein the grating is a holographic reflection grating.

13. The invention as defined in claim 9 wherein the grating has regulated bandwidths.

14. The invention as defined in claim 9 wherein the multi-mode waveguide is curved.

15. An apparatus for coupling light waves into a single-mode planar optical path comprising a curved continuous mode waveguide which is spaced apart from the planar optical path by a gap, the curvature of the waveguide and the distance across the gap being such that the phase-matching condition and the amplitude condition for coupling are optimized.

* * * * *

UNITED STATES PATENT OFFICE
CERTIFICATE OF CORRECTION

Patent No. 5,018,814         Dated May 28, 1991

Inventor(s) Tomasz P. Jannson and Joanna L. Jannson

It is certified that error appears in the above-identified patent and that said Letters Patent is hereby corrected as shown below:

Col. 5, line 65, "ß" should read -- $\beta$ --.

Col. 10, lines 14-17, "is no longer discrete but continuous and the mode solutions are no longer real but complex. The propogating wave is therefore attenuated because it leaks out of the waveguide. The imaginary part represents the mode leakage, and the leakage length," should not be in superscript type but in normal type.

Signed and Sealed this

Twenty-ninth Day of September, 1992

Attest:

DOUGLAS B. COMER

*Attesting Officer*   *Acting Commissioner of Patents and Trademarks*